March 13, 1934.　　　T. A. HUNTER　　　1,950,798

EXCITATION OF LOUD SPEAKER MOTORS

Filed Dec. 13, 1930

INVENTOR.
Theodore A. Hunter
BY Allen & Allen
ATTORNEYS

Patented Mar. 13, 1934

1,950,798

UNITED STATES PATENT OFFICE 1,950,798

EXCITATION OF LOUD SPEAKER MOTORS

Theodore A. Hunter, Cincinnati, Ohio, assignor to The Crosley Radio Corporation, Cincinnati, Ohio, a corporation of Ohio Application December 13, 1930, Serial No. 502,106

12 Claims. (Cl. 175—339)

My invention relates primarily to the actuation of loud speaker motors by an energizing current which has both a direct and an alternating component. While not restricted to such an output current, my invention will be described in the ensuing specifications with reference to the utilization of the current furnished by a final push-pull stage of audio amplification. In loud speaker motors having both field and voice coils, methods of connecting the field and voice coils to each other and to the plates of the tubes in the push-pull stage, as well as the source of B power, are known, said connections permitting the excitation of the field coil winding by the direct current component of the said stage, and the excitation of the voice coils primarily by the alternating current component of the said stage. It is an object of my present invention to provide a construction of my present invention to provide a construction including a magnetic assembly and an armature, together with suitable coils in which I secure an actuation of the field by the direct current component, and an actuation of the armature by the alternating current component. I have, however, gone a step further than this in that I do not provide separate field and voice coils, but, on the contrary, I provide but one coil, or set of coils which serve both functions. This has hitherto been thought an impossibility; but I have found that I can secure the type of actuation desired by means of the magnetic structure of my motor, as will hereinafter be explained. Thus it is one of my objects to provide in a motor which does not have separate field and voice coils, a magnetic structure such that the armature will be excited substantially entirely by the alternating component of the impressed current and the field substantially entirely by the direct component thereof. It is a further object of my invention to accomplish this without producing in the armature a saturation by the field flux, and without the deleterious effects of sending the alternating flux through the field structure.

These and other objects of my invention which will be set forth hereinafter or will be apparent to one skilled in the art upon reading these specifications, I accomplish by that certain construction and arrangement of parts of which I shall now describe a preferred embodiment, reference being had to the drawing which forms a part hereof, and in which.

Figure 1:
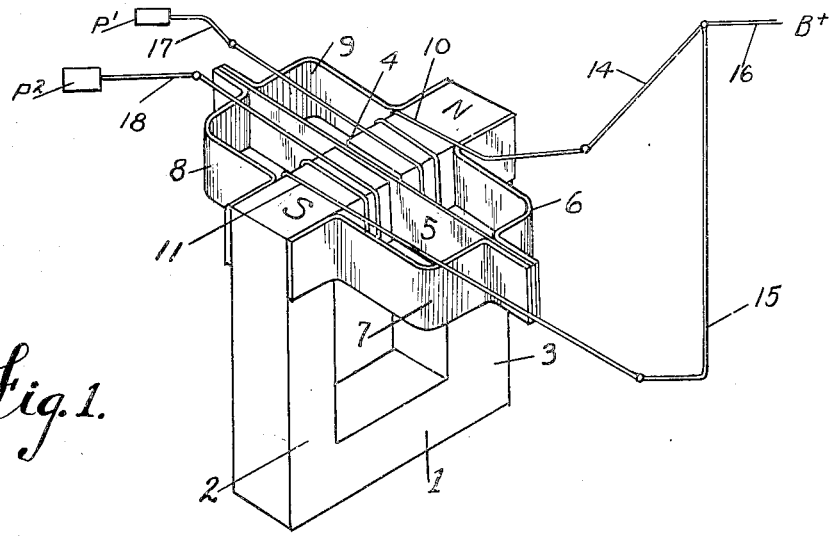
Figure 1 is a diagrammatic perspective view of a motor to which my invention has been applied.

In the exemplary embodiment chosen I shall describe my invention as applied to a motor having the magnetic structure of the motor described in my co-pending application for Letters Patent, filed jointly with Ronald J. Rockwell, Ser. No. 511,152, filed Jan. 26, 1931. In Figure 1 I have shown diagrammatically a field structure of magnetic material formed in the shape of a C, and having a back portion 1, side portions 2 and 3, and approaching top portions forming pole pieces and marked respectively N and S. These pole pieces are on the ends of the legs 2 and 3 opposite from the back portion 1, and they approach each other so as to leave between them an air gap 4, as shown. Lying transversely to the plane of the field structure just described, I have shown an armature 5 in the shape of a strip of magnetic material, which will be understood as held at its ends so as to extend through the air gap 4 substantially mid-way between the poles N and S. I have shown bracket-like pieces of thin magnetic material indicated at 6, 7, 8, and 9 respectively, connecting the outer portions of the pole pieces N and S and the outer ends of my armature. These brackets form a magnetic bridge structure interconnecting the ends of the armature and the poles of the field structure. It will be noted that the plane of this bridge structure is transverse to the plane of the field structure, or magnetic core hereinabove described, and it will also be observed that if the armature and the brackets 6, 7, 8, and 9 be regarded as forming a magnetic circuit, or a plurality of magnetic circuits, that the said circuits do not embrace any part of the field structure, excepting the pole pieces N and S.

In the application Ser. No. 511,152, hereinabove referred to, I showed a field coil mounted upon the back portion 1 of my field core, and I showed voice coils mounted on the armature on either side of the field pole pieces. In such a structure it was intended primarily to separately excite the field coil by direct current from an independent source, the voice coils being actuated by the alternating current delivered by a stage of audio-frequency amplification, or the like.

Figure 2:
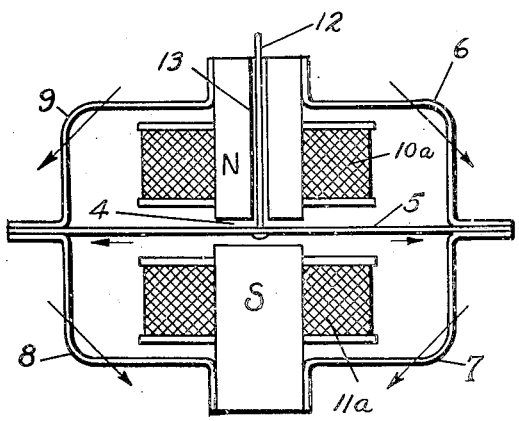
Figure 2 is a semi-diagrammatic elevation of my motor.

In the practice of my present invention I dispense both with the field coil and voice coils aforementioned. I have shown a winding 10 on the pole piece N, and another winding 11 on the pole piece S in Fig. 1, where they are indicated diagrammatically. In Figure 2 I have instead represented coils 10a and 11a to serve the same purpose. The object of the actuation of my motor is, of course, to produce a vibration in the armature 5, which, as shown in Figure 2, may be transmitted to a vibratile device for sound reproduction by a drive rod 12 passing through a hole 13 in one of the pole pieces. The drive rod 12 may be connected either directly or through a suitable motion transmitting device to a cone, as an example. It will be noted that the coils 10 and 11 are wound on the poles N and S in opposite directions, in the exemplary construction and circuit shown.

In a push-pull amplifier the relation of the direct plate current to the superimposed alternating voice current is such that my two coils 10 and 11, mounted directly upon the magnetic circuit of my loud speaker, can be so connected that the field will be excited by the direct and the armature excited by the alternating current. I am enabled also to eliminate the final transformer or impedance of the push-pull stage, and to utilize my coils 10 and 11 to give the required impedance for this purpose, there being provided, as I shall hereinafter explain, a center tap as required by the push-pull system. It will be clear that since the coils 10 and 11 are to serve both for field and armature excitation, they must be designed so as to have both a proper impedance with relation to the plate circuits of the push-pull tubes, and also to have a proper number of ampere turns for the field excitation based upon the direct plate current from the tubes. This calls for special and careful design, but coils of the required characteristics can be produced by those skilled in the art without the exercise of invention from a calculation based upon well known values.

It will now be clear from a consideration of Figure 1, that there is a field circuit, i. e. the main field core comprising the pole piece N, the leg 3, the back portion 1, the leg 2, and the pole S. This structure will be of relatively heavy metal, and in commercial practice for consideration of economy and ease of manufacture I have found it convenient to make the core laminated. This is not, however, necessary. The armature assembly will also be seen to lie in a magnetic circuit, or plurality of circuits which comprise the bracket members 6, 7, 8, and 9, the armature itself, but no portion of the field core structure, excepting the pole pieces N and S. The bracket members 6, 7, 8, and 9 are of relatively thin magnetic material, being in commercial practice narrow strips of sheet iron not substantially wider than the armature itself, and in any event, very much smaller in size than the members which make up the field core structure itself. When the field core is magnetized so that the pole pieces N and S become respectively the north and south poles of a C-shaped magnet, the brackets 6 and 7 constitute a magnetic by-pass upon one side between the poles N and S, and the brackets 8 and 9 constitute a magnetic by-pass on the other. The brackets, however, being relatively so small, have relatively very little flux carrying capacity and become substantially saturated when the field core structure is excited. Thus the amount of flux which they by-pass does not substantially weaken the magnetic effects of the poles N and S, but it has, as hereinafter to be explained, a great effect upon the operation of my motor.

I have indicated in Figure 1 by the symbol B+ a source of plate potential, and I have indicated at P¹ and P² respectively, the plates of the tubes in the push-pull stage of amplification hereinabove referred to. I connect my coils 10 and 11 together by leads 14 and 15, and to the source of B potential by a lead 16. I also connect my coil 10 by a lead 17 to the plate P¹, and my coil 11 by a lead 18 to the plate P², the leads 14 and 15 being connected together and to the source of plate potential, thereby furnishing a center tapped construction such that the windings 10 and 11 taken together, may constitute the inductive parts of the second impedance of the push-pull stage. The impedance of the coils 10 and 11 will be so proportioned that they can serve this end, with due regard also to the production of an adequate field strength through the proper number of ampere turns therein. An examination of the connections just described will show that a uni-directional current flowing between the source of plate potential B+ and either of the plates P¹ or P² will tend to magnetize the field core in such a way that the pole piece N becomes the north pole, and the pole piece S becomes the south pole thereof. As respects the direct current component, the magnetic effect of the coils 10 and 11 will be cumulative; and although the current in the lead 16 may divide and follow either the lead 14 through coil 10 to plate P¹, or the lead 15 through the coil 11 to the plate P², the energizing of either or both of said coils by said uni-directional current will always tend to energize the said field core in the same direction.

The effect of the alternating current in the system will now be explained. The alternating flux set up thereby will largely be confined to a path comprising an armature 5, the brackets 6, 7, 8, and 9, and the adjacent portions of the pole pieces N and S. It has hereinabove been explained that the two by-passing paths for the field flux, namely the brackets 6 and 7 on the one side, and the brackets 8 and 9 on the other, cannot carry a great deal of this flux without becoming saturated, and it is my object so to excite my motor that these bracket members are operated at a point within the higher part of the saturation curve, as will readily be understood. While they cannot carry substantially any greater flux in the same direction, they can pass flux in the opposite direction to the direction of their saturation. I have indicated in Figure 2 a diagrammatic showing of the magnetic circuits in my motor, to which the alternating flux is substantially confined. I have also indicated by arrows the direction of the field flux. It will be clear that an alternating current in the circuit comprising the plate P¹ and the coil 10 will, in half of its cycle, reinforce the effect of the direct current hereinabove referred to, and in the other half of its cycle will set up a magneto-motive force in the coil 10 in the opposite direction, because the said half-cycle traverses the said coil in the opposite direction. Excepting in its direction of saturation, a path comprising one of the brackets will be a path of lower magnetic reluctance than a path comprising the pole piece N, the leg 3, the back portion 1, the leg 2, and the pole piece S of the field core structure. Let it be supposed, then, that in the coil 10a of Figure 2 there is set up a component of an alternating field which is opposite in direction to the normal field flux. This flux will tend to divide at the armature and pass out to the ends thereof. As a consequence, it will tend, in part, to return along paths embracing the brackets 7 and 8 (which are saturated in the direction of the arrow, but are not saturated in the direction of said return). It will also tend to flow through the armature 5 and from the outer ends of the brackets 7 and 8 toward the center thereof, magnetizing said center of the armature as a north pole, whereupon it will be attracted toward the south pole S, and thereby be caused to move. On the other hand, a half cycle impulse in the coil 10a which tends to reinforce the magnetic flux in the direction of the arrow connecting poles N and S will, in large part, enter the armature 5 and will flow outwardly from the center thereof toward the brackets 6 and 9. It will tend to return along these brackets to the pole piece N, because these brackets, although saturated in the direction of the arrows, are not saturated in the direction of said flow. On this half cycle, then, the center of the armature will be magnetized as a south pole and will be attracted toward the pole piece N. The flux will not tend, however, to flow through the brackets 7 and 8, because these brackets are saturated in the direction of such flow and can carry substantially no more flux.

The same cycle of operations may be described for that circuit which comprises the plate P² and the coil 11. A magneto-motive impulse produced in the coil 11a, which is in the same direction as the arrow connecting the pole pieces N and S, will tend to return along by-pass paths provided by the brackets 7 and 8 and enter the armature 5 from the outer ends, proceeding toward the center thereof and magnetizing the center as a north pole, whereupon it will be attracted toward the pole piece S. A magneto-motive impulse on the other half cycle produced in 11a, which impulse is in a direction opposite to that of the arrow connecting poles N and S, will enter the armature at the center part, flow outwardly toward the ends thereof, and will return along by-pass paths provided by the brackets 6 and 9 to and through the pole piece N. The effect thereof will be to magnetize the center of the armature as a south pole, and to cause it to be attracted toward the pole N. The same flux, however, will not flow through brackets 7 and 8 because those brackets are saturated in the direction of the said flow, as indicated by arrows.

Thus impulses in the circuits of the plates P¹ and P² reinforce each other in producing motion in the armature 5, which is transmitted to a reproducing device by the drive rod 12. To magneto-motive impulses produced in the pole pieces in the adjacent armature by that component of an alternating current which is opposite to the main field excitation current there will be presented paths of relatively low magnetic reluctance which embrace the armature 5, and alternating pairs of the brackets, but which do not embrace the main field core structure. To magneto-motive impulses produced by that component of the alternating current in the same direction as the main field excitation current there will also be presented relatively low reluctance by-pass paths embracing the armature, and such operations of the impulses as are produced by the said component in the same direction as the main field flux will merely tend to reinforce the said main field flux. Of course, if the field core is operated in a substantially saturated condition there will be substantially no part of the alternating flux which will pass therethrough, the alternating flux being then confined substantially entirely to paths comprising the pole pieces, the brackets, and the armature. Even where the field core is operated in a relatively unsaturated condition, however, there will be very little of the alternating flux passing through it because of the relatively low reluctance of the by-pass paths, as hereinabove described.

The armature will be found, however, to be practically unsaturated by the field flux as such. This field flux is by-passed by saturated circuits comprising the brackets, but it will be noticed that since the armature is connected to points in these by-pass saturated circuits which are not at different magnetic potentials, there will be no tendency for the field flux as such to flow through my armature.

It has been noted in my application Ser. No. 511,152 hereinabove referred to, not only that my armature is unsaturated by the field flux, but also that there is very little tendency of my armature to stick to the poles N and S. In other magnetic speakers the attraction of the armature toward any pole increases so rapidly as the armature approaches the pole, as to make the response of the speaker substantially non-rectilinear, to the extent in many instances of producing distortion. The response of the speaker described in the said application is substantially rectilinear, and in the construction shown and described herein I achieve the same advantages.

Figure 3:
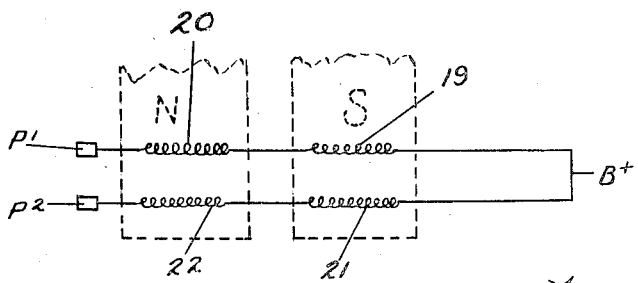
Figure 3 is a circuit diagram of a modified form of actuating coils.

As a modification of the construction described hereinabove, I may make use of double coils on each of the poles N and S, and so interconnect the said coils that while I achieve the same results, both the alternating and the direct current in either of the paths between the B source and the respective plates will be effective upon both of the poles. I have indicated in Figure 3, a B source and the plates P¹ and P², which are the same as before. I have also indicated coils 19 and 20, which are connected in series between the plate P¹ and the B source and have magneto-motively cumulative effects, although located one upon the north pole piece and the other upon the south pole piece. I have also indicated coils 21 and 22 connected in series between the plate P² and the B source, and connected so as to have magneto-motively cumulative effects, one of the coils, namely coil 21, being located on the south pole piece, and coil 22 on the end pole piece. Dotted lines indicate the pole pieces in Figure 3.

Having thus described my invention, what I claim as new and desire to secure by Letters Patent, is:—

1. In a loud speaker having a field core structure, an armature and magnetic means connecting said field core structure and said armature, a winding adapted to be actuated by a current having an alternating and a direct component, and means for by-passing a component of the flux produced by said alternating component in a path comprising said armature and said magnetic connecting means but not co-extensive with said field structure.

2. In a loud speaker, a field core structure and a magnetic armature, a coil adapted to be actuated by a current having a direct and alternating component, and magnetic means for substantially confining the flux produced by the said direct component to one path, and the flux produced by said alternating component to another path substantially at right angles thereto.

3. In a loud speaker motor having a field core structure comprising a magnetic circuit, and a magnetic armature structure including a magnetic armature and comprising another magnetic circuit, a coil on a portion of said field structure adapted to be excited by current having both an alternating and direct component, and magnetic means for substantially segregating the flux produced by said direct component from the flux produced by said alternating component.

4. In a loud speaker motor, a field core structure comprising a magnetic circuit, and a magnetic armature structure including a magnetic armature and comprising a different magnetic circuit, a coil adapted to be excited by current having an alternating and a direct component, and magnetic means for causing the fluxes respectively produced by said components selectively to follow said paths, said paths having a common component and uncommon components 5. In a loud speaker motor, a field structure comprising a magnetic circuit in one plane, and a magnetic armature structure including a magnetic armature and comprising a magnetic circuit in another plane, said circuits having a common portion, and a coil located on said common portion.

6. In a loud speaker, a field structure having a magnetic circuit, and an armature structure having a magnetic circuit, said magnetic circuits being non-coincident but having a common portion, a coil adapted to be actuated by alternating and direct current components at the same time situated so as to be effective on said common portion, said armature structure having components adapted to become saturated and to present path portions of high magnetic reluctance.

7. In a loud speaker, a field structure and an armature structure comprising means for connecting said armature to said field structure magnetically, a pair of coils having a common connection between them, and a source of plate potential, the other ends of said coils being adapted for connection respectively to the plates of tubes in a push-pull stage of audiofrequency amplification, said coils adapted to act as impedances for said stage, and magnetic means in said speaker both for substantially confining the magnetic flux produced by the direct current component of said stage to said field structure, the magneto-motive effect of said coils as respects said direct current component being cumulative, and for substantially confining the flux produced by the alternating component of said current substantially to a path comprising said armature and said connecting means but non-coincident with said field structure, said connecting means being adapted to provide high reluctance magnetic paths.

8. In a loud speaker, a field structure comprising a C-shaped core having pole pieces defining an air gap, an armature mounted in said air gap, high reluctance by-pass paths comprising structures connecting said armature and said pole pieces, and a coil mounted on one of said pole pieces.

9. In a loud speaker motor, a field structure comprising a magnetic circuit having interspaced pole pieces, an armature mounted between said pole pieces, high reluctance magnetic by-pass path structures connecting the outer ends of said armature with said pole pieces, and a coil on each of said pole pieces, said coils having a common connection with respect to which they are cumulatively wound.

10. In a loud speaker motor, a field structure comprising members providing a magnetic circuit and interspaced pole pieces, an armature mounted between said pole pieces, members of high reluctance connecting said armature with said field structure to form a magnetic path non-coincident with said first mentioned magnetic path, a pair of oppositely wound coils on said pole pieces, a common connection between said coils adapted to be connected with a source of B potential, and separate connections for said coils adapted for the connection of said coils with the plates of tubes in a stage of audiofrequency push-pull amplification.

11. In a loud speaker motor, a field structure comprising members providing a magnetic circuit and interspaced pole pieces, a magnetic armature mounted for movement between said pole pieces, a pair of interspaced coils on said field structure, said coils lying on opposite sides of said armature, high reluctance magnetic members connecting said armature and said field structure, said members adapted to provide shifting magnetic paths for magnetic fluxes produced by an alternating current component in said coils, said coils being so connected as to keep said members saturated with a steady flux produced in said field structure by a direct current component of said current.

12. In a loud speaker motor, a field structure comprising portions providing a magnetic circuit and interspaced pole pieces, an armature mounted between said pole pieces, separate magnetic by-pass members connecting the outer ends of said armature to said pole pieces, coils mounted on said pole pieces, said coils connected in series with a center tap, said coils oppositely wound, whereby current flowing to or from said center tap will produce a cumulative magnetic effect therein.

THEODORE A. HUNTER.